United States Patent [19]

Talbot et al.

[11] Patent Number: 5,602,741
[45] Date of Patent: Feb. 11, 1997

[54] CENTIMETER ACCURATE GLOBAL POSITIONING SYSTEM RECEIVER FOR ON-THE-FLY REAL-TIME KINEMATIC MEASUREMENT AND CONTROL

[75] Inventors: Nicholas C. Talbot, Cupertino; Michael T. Allison, Santa Clara; Mark E. Nichols, Sunnyvale, all of Calif.

[73] Assignee: Trimble Navigation Limited, Sunnyvale, Calif.

[21] Appl. No.: 644,422

[22] Filed: May 10, 1996

Related U.S. Application Data

[63] Continuation of Ser. No. 199,387, Feb. 18, 1994, Pat. No. 5,579,620.
[51] Int. Cl.$^6$ .............................. G01S 3/02; G01S 5/02; G06F 165/00
[52] U.S. Cl. .............................. 364/449.7; 364/423.098; 342/357; 342/457; 348/148
[58] Field of Search .............................. 364/449, 424.01, 364/424.02; 342/357, 457, 442, 444; 348/118, 119, 135, 142, 148; 318/587

[56] References Cited

U.S. PATENT DOCUMENTS

| | | | |
|---|---|---|---|
| 4,677,555 | 6/1987 | Goyet | 364/424 |
| 4,700,301 | 10/1987 | Dyke | 364/424 |
| 4,807,131 | 2/1989 | Clegg | 364/424.01 |
| 5,144,317 | 9/1992 | Duddek et al. | 342/357 |
| 5,148,179 | 9/1992 | Allison | 342/457 |
| 5,471,218 | 11/1995 | Talbot et al. | 342/357 |

OTHER PUBLICATIONS

"Recent Advances in GPS Hardware & Software", Timble Navigation. Presented at National Conference on GPS Surveying; Sydney, Australia, Jun. 25–26, 1992.
B. Remondi, "'On–The–Fly' Kinematic GPS Results Using Full–wavelength Dual–Frequency Carrier Ranges". No Date.

*Primary Examiner*—Michael Zanelli
*Attorney, Agent, or Firm*—Thomas E. Schatzel; Law Offices of Thomas E. Schatzel A Prof. Corp.

[57] ABSTRACT

A system embodiment of the present invention comprises a fixed and a roving pair of four-observable GPS receivers and a communication link between them for double differencing code and carrier measurements. Carrier phase integer ambiguities are resolved efficiently by searching the simultaneous narrow-lane intersections of both the L1 and L2 wave fronts propagated by the GPS satellites being tracked. External constraint information, such as elevation, is additionally used to speed up integer ambiguity resolution. Data between the reference station and the rover is communicated in compressed form at a regular interval, e.g., once a second at each epoch, and demi-measurements of carrier phase are obtained more frequently, e.g., ten times a second, and used to propagate solutions between epochs.

9 Claims, 3 Drawing Sheets

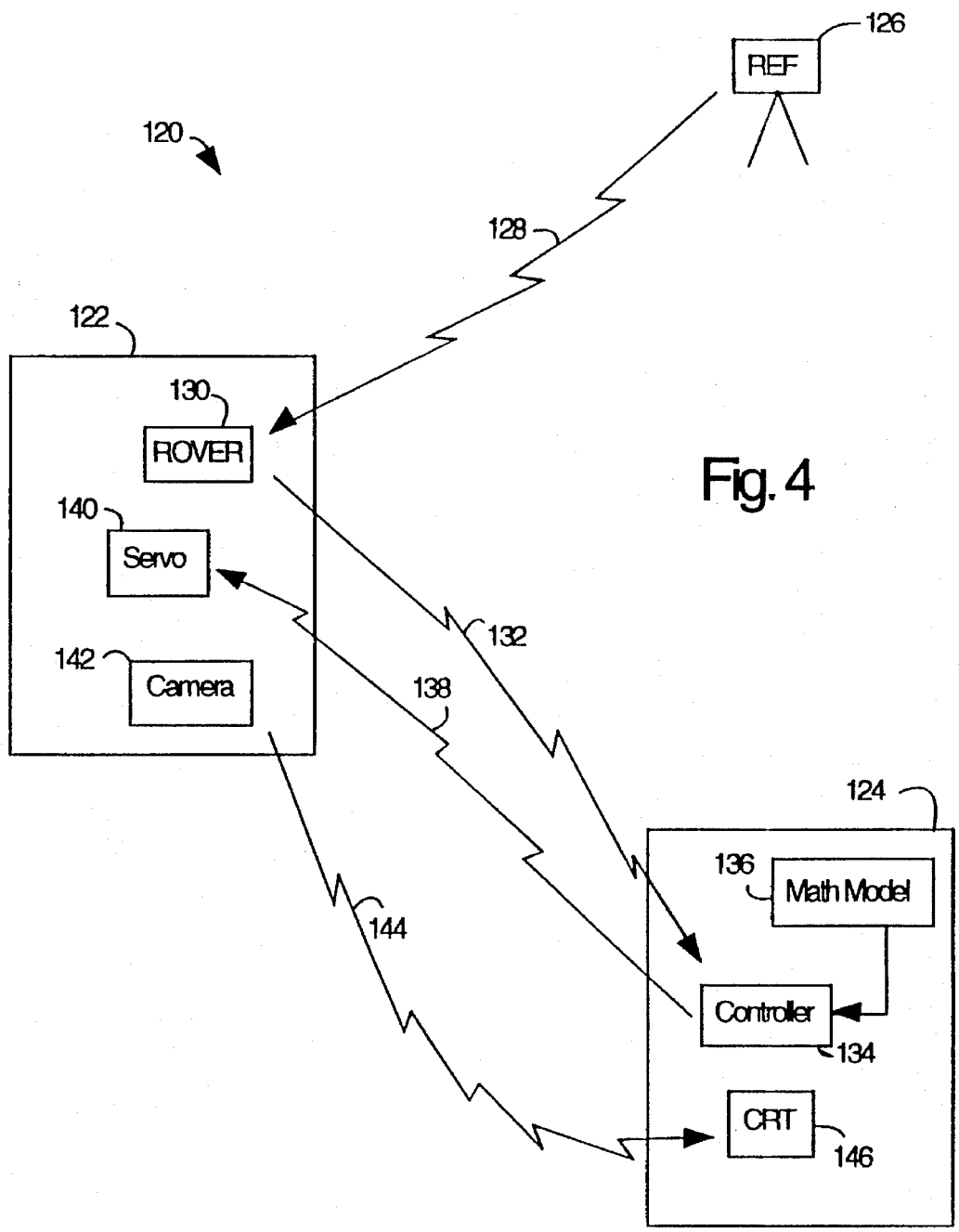

CENTIMETER ACCURATE GLOBAL POSITIONING SYSTEM RECEIVER FOR ON-THE-FLY REAL-TIME KINEMATIC MEASUREMENT AND CONTROL

RELATED APPLICATIONS

This application is a continuation of application Ser. No. 08/199,387 filed on Feb. 18, 1994, now U.S. Pat. No. 5,579,620.

A copending U.S. patent application Ser. No. 08/026,547, filed Mar. 4, 1993, by Nicholas Charles TALBOT, et al., and titled "LOCATION AND GENERATION OF HIGH ACCURACY SURVEY CONTROL MARKS USING SATELLITES", is incorporated herein by reference.

BACKGROUND OF THE INVENTION

1. Field of the Invention

The invention relates generally to navigation systems and industrial control systems and more specifically to combinations of navigation and industrial controls that provide centimeter accuracy in the positioning and movement of operating machinery and robots.

2. Description of the Prior Art

When originally conceived, the global positioning system (GPS) that was made operational by the United States Government was not foreseen as being able to provide centimeter-level position accuracies. Such accuracies are now commonplace.

Extremely accurate GPS receivers depend on phase measurements of the radio carriers that they receive from various orbiting GPS satellites. Less accurate GPS receivers simply develop the pseudoranges to each visible satellite based on the time codes being sent. Within the granularity of a single time code, the carrier phase can be measured and used to compute range distance as a multiple of the fundamental carrier wavelength. GPS signal transmissions are on two synchronous, but separate, carrier frequencies "L1" and "L2", with wavelengths of nineteen and twenty-four centimeters, respectively. Thus within nineteen or twenty-four centimeters, the phase of the GPS carrier signal will change 360°.

However, the number of whole cycle (360°) carrier phase shifts between a particular GPS satellite and the GPS receiver must be resolved. At the receiver, every cycle will appear the same. Therefore there is an "integer ambiguity". The computational resolution of the integer ambiguity has traditionally been an intensive arithmetic problem for the computers used to implement GPS receivers. The traditional approaches to such integer ambiguity resolution have prevented on-the-fly solution measurement updates for moving GPS receivers with centimeter accurate outputs. Very often, such highly accurate GPS receivers have required long periods of motionlessness to produce a first and subsequent position fix.

There are numerous prior art methods for resolving integer ambiguities. These include integer searches, multiple antennas, multiple GPS observables, motion-based approaches, and external aiding. Search techniques often require significant computation time and are vulnerable to erroneous solutions or when only a few satellites are visible. More antennas can improve reliability considerably. If carried to an extreme, a phased array of antennas results whereby the integers are completely unambiguous and searching is unnecessary. But for economy, the minimum number of antennas required to quickly and unambiguously resolve the integers, even in the presence of noise, is preferred.

One method for integer resolution is to make use of the other observables that modulate a GPS timer. The pseudo-random code can be used as a coarse indicator of differential range, although it is very susceptible to multipath problems. Differentiating the L1 and L2 carriers provides a longer effective wavelength, and reduces the search space. However, dual frequency receivers are expensive because they are more complicated. Motion-based integer resolution methods make use of additional information provided by platform or satellite motion. But such motion may not always be present when it is needed.

Another prior art method and apparatus for precision attitude determination and kinematic positioning is described by Hatch, in U.S. Pat. No. 4,963,889, comprises the steps of determining the approximate initial relative position of a secondary antenna that is freely movable with respect to a reference antenna; making carrier phase measurements based on the reception of "N" number of satellites, where N is the minimum number of satellites needed to compute the relative position of the secondary antenna; deriving from the carrier phase measurements an initial set of potential solutions for the relative position, wherein the initial set of potential solutions all fall within a region of uncertainty defined by a sphere having a radius equal to the maximum distance between the two antennas, and wherein multiple potential solutions arise because of whole-cycle ambiguity of the carrier signal; making redundant carrier phase measurements based on the reception of a carrier signal from an additional satellite (N+1); and eliminating false solutions from the initial set of potential solutions, based on a comparison of the redundant carrier phase measurements with the initial set of potential solutions, to reduce number of potential solutions to close to one, whereby the number of potential solutions is not increased by use of the redundant carrier phase measurements.

"Deriving from the carrier phase measurements an initial set of potential solutions" means that the initial set are derived from just two satellites. The rest of the Hatch specification explains why N is exactly two in the case of attitude determination. Planar intersections of wave fronts are formed from the two satellites, thus obtaining a collection of parallel lines. The intersection points of these lines and a baseline sphere are determined, producing the initial set of potential solutions. For example, as explained at column 12, line 35 of Hatch, there are 188 points or potential solutions in the initial set. In the Hatch method, "eliminating false solutions from the initial set of potential solutions," means eliminating 187 of those 188 points. The idea of potential solutions refers to the initial set of 188 points.

Hatch forms an initial collection of around 188 potential solutions using just two satellites, and then uses phase measurements of the remaining satellites to whittle away at that small initial collection, leaving only one candidate solution if phase measurements are accurate enough. Hatch avoids having to deal with large numbers of integer combinations.

Donald Knight, in U.S. Pat. No. 5,296,861, titled "METHOD AND APPARATUS FOR MAXIMUM LIKELIHOOD ESTIMATION DIRECT INTEGER SEARCH IN DIFFERENTIAL CARRIER PHASE ATTITUDE DETERMINATION SYSTEMS", and incorporated herein by reference, describes a method of reducing the mathematical intensity of integer ambiguity resolution.

Aside from making carrier phase measurements and determining a region of uncertainty, Hatch's method is essentially a two-step method, which is a way to avoid the problem of large numbers. The essence of the Knight patent is to do the opposite, plunging into a sea of possible solutions, even if there are trillions of them, and finding the single, best solution out of the entire product space of possibilities.

If ten different whole cycle values can be added to the first difference phase measurements from each of four satellites, then Knight defines $10^4$ or 10,000 possible acceptable solutions. Knight then finds the one-and-only solution out of 10,000 that matches the measured phase data better than all 9,999 other combinations. If eight satellites are available (which does happen), then Knight finds the single best solution out of $10^8$ or 100 million possibilities. If two antenna pairs are present, then the number becomes $(10^8)^2 = 10^{16}$. Thus whereas Hatch uses a two-step method of avoiding large numbers, Knight provides a practical method for finding the single best solution in a solution space with thousands or millions of possibilities. Hatch even suggests that the Knight approach is incorrect. For example, at column 8, Line 63, Hatch states: "if ten different whole cycle values can be added to the first differences from each of the four satellites, then one might expect $10^3$ or 10,000 possible solutions within the uncertainty region . . . . Indeed, some authors have defined the number of possible acceptable solutions in exactly this fashion."

Knight describes a method that is more computationally intensive than Hatch's, and has proven to be reliable and workable in commercially-viable applications. Hatch's method avoids the problem of large numbers, and does best under conditions in which the problem of large numbers does not exist, e.g., under conditions where the myriad of possible solutions collapse into a handful. In the real world, conditions are usually not optimum, which would require the corresponding equipment that uses Hatch's method to be more complex, in order to achieve the same results as the present invention's.

Hatch's two-step method includes preliminary steps involving making carrier phase measurements, and then numbering them one through N, followed by an $(N+1)^{th}$ measurement. It could be expected that any similar apparatus will make carrier phase measurements, and the basic idea of interferometry is conventional, regardless of how the carrier phase measurements are numbered. Such preliminary steps define which carrier phase measurements are involved in generating an initial set of potential solutions, and which carrier phase measurement is defined to be the redundant measurement for eliminating potential solutions. As applied to attitude determination, the step of determining the approximate relative position of the secondary antenna equates to measuring the distance between the antennas, and noticing that the secondary antenna has to lie on a sphere centered at the main antenna.

Hatch's method involving a "plurality N of satellites" is not the same as a "plurality of satellites". As applied to attitude determination, N is exactly two. As applied to kinematic surveying, N is exactly four. Hatch makes this explicit in FIG. 7, blocks 58 and 62, and states at column 12, line 3, "The first computations to be performed in an attitude determination application are to compute the entire set of potential solutions based on the carrier phase measurements from two satellites. One of the significant features of the method described is the use of only two of the satellites to determine the set of potential solutions, rather than more than two satellites. Hatch explains that only a plurality of N=2 satellites are required" . . . in the attitude determination application, . . . [there is] only a two dimensional uncertainty region corresponding to the surface . . . . Thus only two satellites are needed to define all the potential solutions that can exist on the two dimensional uncertainty region . . . . The attitude detection application is a two dimensional uncertainty problem, requiring two satellites to define all of the potential solutions . . . . The final broad step in the method of the invention is eliminating false potential solutions based on redundant information from additional satellites, i.e. additional to the minimum two . . . satellites required to define all of the potential solutions . . .

The phrases "initial set", "initial set of potential solutions" and "possible solution", refer specifically to the result obtainable by applying the first step of Hatch's two-step method. This "initial set of potential solutions" is to be generated from the received carrier signals of two and only two satellites, since the teaching is that "only two satellites are required to define all of the potential solutions."

The notion of "potential solutions" is thus restricted to 188 points, or to some such number in a similar example, but certainly not 10,000 solutions. It is also very clear that "eliminating false solutions from the initial set of potential solutions" means eliminating 187 points out of 188 points.

Hatch contends that it is not necessary to consider 10,000 possible solutions, because "the uncertainty region is two dimensional" and the measurements from any two satellites span the region of uncertainty. Using two satellites results in a collection of only 188 possibilities. Hatch contends that the correct solution is one of those 188 points, and that those 188 points are the only possibilities, that those other myriad of possibilities do not exist.

The "initial set of potential solutions" of Hatch cannot be extended to cover an entire product space of 10,000 solutions, because the essence of the two-step method is avoiding the problem of large numbers. Hatch proposes reducing the dimensionally of the solution space to the bare minimum and declares that the right answer has to lie within that reduced solution space, and that only the first measurements corresponding in number to the bare dimensionally are required to determine all the possible solutions.

Knight does not include an initial set. The method of Knight is to search for the right answer somewhere among 10,000 possibilities and finds the single best match out of such possibilities. There is no reason to stop and look at 188 possibilities when the remainder of 10,000 possibilities have to be searched. Furthermore, those 188 possibilities defined by Hatch do not resemble anything in Knight. Knight does not involve deriving from the carrier phase measurements an initial set of potential solutions for the relative position. Furthermore, Hatch generates those 188 points using a nonlinear operation on the carrier phase measurements of two satellites, something that Knight does not.

Hatch eliminates false solutions from the initial set of potential solutions, whereby the number of potential solutions is not increased by use of the redundant carrier phase measurements. Knight does not deal with Hatch's "initial set", whether to create it or eliminate from it. Most of the time, in a commercially-viable apparatus, the right solution will not be found in such an initial set.

If carrier phases could be measured perfectly, without radio reflections, reception noise, non-common antenna phase center motion, temperature sensitive drifts and other corruption of the measured phase data, then the attitude determination problem really would be two-dimensional. The right solution for position of the secondary antenna might then be found within Hatch's initial set of 188 potential solutions. Determining the right solution would be a simple matter of eliminating 187 false solutions by comparison with the third carrier phase measurement. As long as phase measurement errors are small enough, the two-step method based on near perfect measurements is satisfactory. Though there is some small perturbation in computed results, the right answer comes out in the end most of the time. Phase measurement errors of about two degrees RMS are usually tolerable.

Only one whole cycle value results in a surface that passes closer to a specific potential solution than any other whole cycle value. The problem is that phase measurements contain error, and geometric considerations amplify this error when measurements are processed in a computing apparatus. There is only one surface that passes closer to a specific potential solution than any other, but unfortunately, the surface that passes closest is often the wrong surface. Another surface farther away may be the right one. Not only can the surface be in the wrong place due to measurement error, Hatch's potential solution may be in the wrong place as well, due to error effects that are worse for the potential solution than the surface.

The supposed potential solution is actually a computational result that is often badly perturbed by phase measurement error combined with geometrical dilution of precision. A scissors effect can amplify measurement errors that distort the planes. Subsequently, the formation of intersections of lines with a sphere introduces a nonlinear operation on noisy data which greatly amplifies some of the errors. Hatch actually chooses the two satellites closest together in order to form an initial set with fewer than 188 points, whereas considerations of error sensitivity would dictate the opposite.

Hatch teaches that only one of the whole cycle values passes closer to a specific potential solution than any other. The two-step Hatch method prescribes that only the closest whole cycle value (from the additional satellite data) is selected for each of the potential solutions whereby the number of potential solutions is not increased. At some point, as phase measurement errors are increased, corresponding to less favorable operating conditions, the prescription begins picking the wrong whole cycle values a significant fraction of the time. Using Hatch's method, there is no way to pursue any option but the closest, and processing a phase measurement with the wrong whole cycle value added to it further accelerates the deterioration of computed results.

By comparison, all of the whole cycle values are tried as possibilities in the Knight method. An integer combination that looks very poor initially becomes more attractive as the solution progresses, eventually finishing as the best possible solution out of 10,000 or more. Every possible integer combination is pursued until, taken as a whole, it can be decided that the combination under development is less likely than another combination that has been completely finished and weighed with all satellite data included. The Knight method does not minimize the solution space dimensionally to the bare minimum and then restricts attention to an "initial set of solutions" obtained with only the data of the first measurements corresponding to that bare dimensionally. Most of the time, under real world conditions, the right answer simply is not to be found. The job of finding the right solution cannot be accomplished by avoiding the problem of large numbers.

Benjamin W. Remondi, reported the status of differential GPS (DGPS) accuracy and on-the-fly (OTF) kinematic GPS (KGPS) in a paper titled, "On-The-Fly Kinematic GPS Results Using Full-Wavelength Dual-Frequency Carrier Ranges".

On-the-fly real-time kinematic (OTF-RTK) positioning systems are useful in earth moving machinery control and guidance, robotic applications and the placement of structures, such as bridge sections. For example, in Japan, a particular construction project in Tokyo Bay requires the highly accurate placement of bridge pilings and sections in the bay from the decks of ships that are rolling and drifting with the sea. Highly accurate OTF-RTK control systems are also useful in guiding unattended bulldozers in the path of volcano lava flows to redirect the flow of lava in hot, hostile environments.

Philip M. Clegg describes an automated earth grading system in U.S. Pat. No. 4,807,131. A powered grading machine is combined with a laser level to control the blade of the grader. The control system described includes an elevation control, a location positioning device, a grader-blade tilt detector, a digital terrain model, a digital computer for terrain comparisons, a blade servo controller and a visual display unit. The automated moving of earth for a wide-range of engineering applications is described. The system computes the location and elevation of a grader-blade and then compares this with a corresponding design height/grade specified in a computerized digital terrain model. If the design height is lower than the current height of the blade, then a cut is required, and the blade is lowered automatically or manually by an operator.

Of particular interest is the use of satellite-based positioning systems, such as the global positioning system (GPS). Clegg mentions the use of celestial satellite positioning systems for the location of the grader. Many engineering applications require precise horizontal and vertical positioning. Centimeter-level GPS is typically achieved by using carrier phase and solving an integer lane ambiguity problem. Clegg does not teach the specifics of GPS nor how it might be used with his device.

The carrier phase ambiguity resolution problem has been the focus of a great deal of attention from research communities. In essence, the integer number of carrier cycles that existed between GPS receiver and satellite at the time that the signal was acquired must be determined. Direct range measurements, combined with the satellite geometry, allow the correct integer carrier phase ambiguities to be determined for a plurality of satellites tracked at two or more sites. Ambiguity resolution techniques that only use GPS measurements have become computationally efficient. The use of additional sensors such as a laser level, electronic distance meter, a compass, a tape, etc., provide valuable constraints that limit the number of possible integer ambiguities that need to be considered in a search for the correct set. For example see, INTEGRATED TERRESTRIAL SURVEY AND SATELLITE POSITIONING SYSTEM, filed Jul. 1, 1993, U.S. patent application Ser. No. 08/086,665.

SUMMARY OF THE PRESENT INVENTION

It is therefore an object of the present invention to provide a on-the-fly real-time kinematic system.

It is a further object of the present invention to provide a remote-controlled servo system with centimeter accuracy for industrial applications.

It is another object of the present invention to provide an apparatus that provides high frequency on-the-fly real-time kinematic updates.

Briefly, a system embodiment of the present invention comprises a fixed and a roving pair of four-observable GPS receivers and a communication link between them for double differencing code and carrier measurements. Carrier phase integer ambiguities are resolved efficiently by searching the simultaneous narrow-lane intersections of both the L1 and L2 wave fronts propagated by the GPS satellites being tracked. External constraint information, such as elevation, is additionally used to speed up integer ambiguity resolution. Data between the reference station and the rover is communicated in compressed form at a regular time interval, e.g., once a second at each epoch, and demi-measurements of carrier phase are obtained at a more frequent rate, e.g., ten times a second, and used to propagate solutions between epochs.

An advantage of the present invention is that a system is provided that does not require reference point initialization, but rather can initialize itself on-the-fly.

Another advantage of the present invention is that a system is provided that has centimeter level position accuracies.

A further advantage of the present invention is that a system is provided that outputs real-time kinematic position solutions in local coordinate formats.

These and other objects and advantages of the present invention will no doubt become obvious to those of ordinary skill in the art after having read the following detailed description of the preferred embodiment which is illustrated in the drawing figures.

IN THE DRAWINGS

FIG. 4 is a block diagram of a vehicle remote control system embodiment of the present invention.

DETAILED DESCRIPTION OF THE PREFERRED EMBODIMENT

Figure 1:
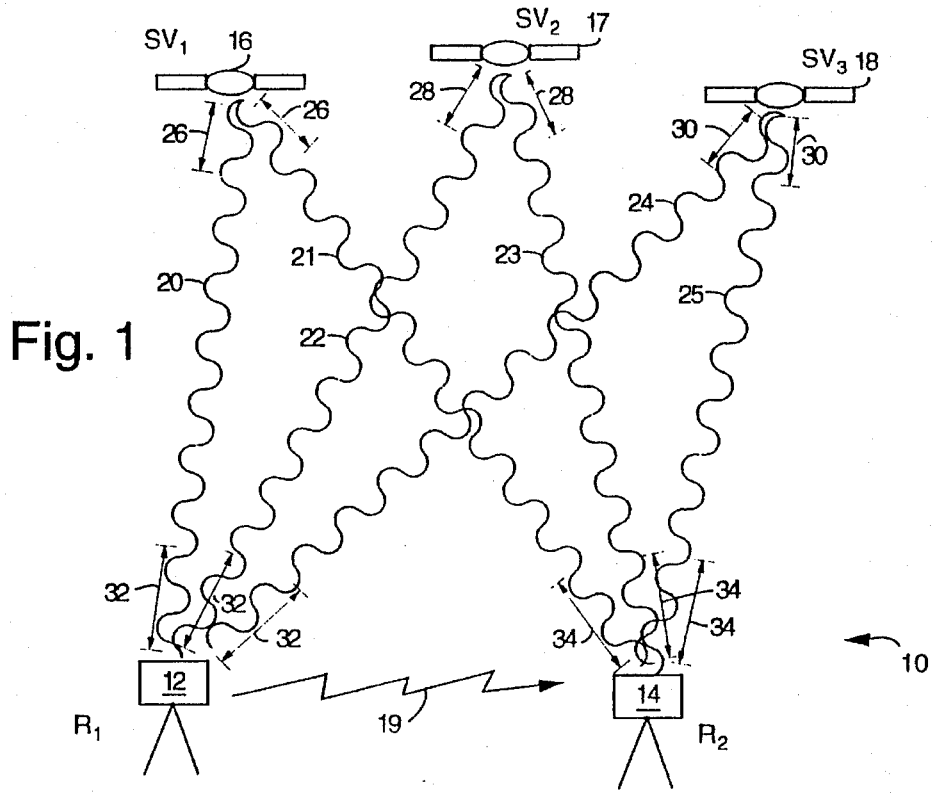
FIG. 1 is a schematic diagram of a GPS-based on-the-fly real-time kinematic system embodiment of the present invention.

FIG. 1 illustrates a on-the-fly (OTF) real-time kinematic (RTK) system embodiment of the present invention, referred to by the general reference numeral 10. System 10 comprises a reference station 12 and a rover 14. On-the-fly ambiguity resolution techniques are used to enable the acquisition of integer phase ambiguities while rover 14 is moving. Such OTF ambiguity resolution avoids the phase continuity requirement of prior art kinematic positioning systems.

A first through third satellite vehicle (SV1–SV3) 16–18 transmit pseudo random number (PRN) codes on two carrier frequencies L1 and L2 (1575.42 MHz and 1227.60 MHz) that are approximately nineteen and twenty-four centimeters in wavelength. Satellite vehicles 16–18 represent the satellite vehicles that may be accessible to reference station 12 and rover 14, e.g., the global positioning system (GPS) satellites operated by the United States Government.

Reference station 12 and rover 14 are three-observable or four-observable type GPS receivers. A three-observable GPS receiver can track L1 code, L1 carrier phase and L2 carrier phase. A four-observable GPS receiver can measure both carrier phase and code on both L1 and L2 frequencies. Reference station 12 communicates its observations to rover 14 via a data link 19. Four-observable measurements are preferred over three-observable receivers. Four-observable measurements provide a wealth of information that can be exploited during data reduction. The present invention is not limited to four-observable measurements, but also includes three-observable measurement. Dual-frequency phase combinations, such as "wide-lane" (eighty-six centimeter wavelength) and ionosphere-free observables are two such conventional phase combinations. A precision code (P-code) carried on the L2 carrier may periodically be encrypted to a secret "Y-code". When encryption is active, reference station 12 and rover 14 switch to a mode in which four observables are maintained by full-cycle L1 and L2 phase measurements, precise L1 coarse acquisition (C/A) code and cross-correlated Y-code data. The cross-correlation technique relies on the fact that both the L1 and L2 Y-codes are identical, although the Y-code itself is not necessarily known. The difference in group delay between the L1 and L2 signals is precisely determined by a cross-correlation technique. The cross-correlation observation is added to the L1 C/A-code observable to derive an L2 range measurement which is used in a variety of ways during data reduction.

Since dual-frequency GPS receivers are more complex and typically more expensive than single frequency receivers, and since three-observable or four-observable measurements are not strictly required in every instance, alternative embodiments of the present invention may substitute single frequency, e.g., L1 code and phase, measurement. Such single-frequency receivers may be used in reference station 12 and the rover 14.

In FIG. 1, each of a plurality of transmitted signals 20–25 comprise a combination of the L1 and L2 carriers. The transmission of signals 20 and 21 includes a satellite clock error that results in a ranging distance error 26. The transmission of signals 22 and 23 includes a satellite clock error that results in a ranging distance error 28. Similarly, the transmission of signals 24 and 25 includes a satellite clock error that results in a ranging distance error 30. Reference station 12 introduces a receiver clock error that results in a ranging distance error 32 common to satellite vehicles 16–18. Rover 14 also introduces a receiver clock error that results in a ranging distance error 34 that is common to satellite vehicles 16–18. Conventional double-differencing techniques are used in rover 14 to subtract out errors 26, 28, 30, 32 and 34 to yield PRN and phase measurements which have greatly reduced satellite-common and receiver-common errors.

Each signal 20–25 has an unknown number of whole-cycle carrier phase transitions between each satellite vehicle 16–28 and the reference station 12 and the rover 14. An interference pattern that results at various observation points amongst these signals 20–25 is used to identify the otherwise ambiguous signal intersections.

Figure 2:
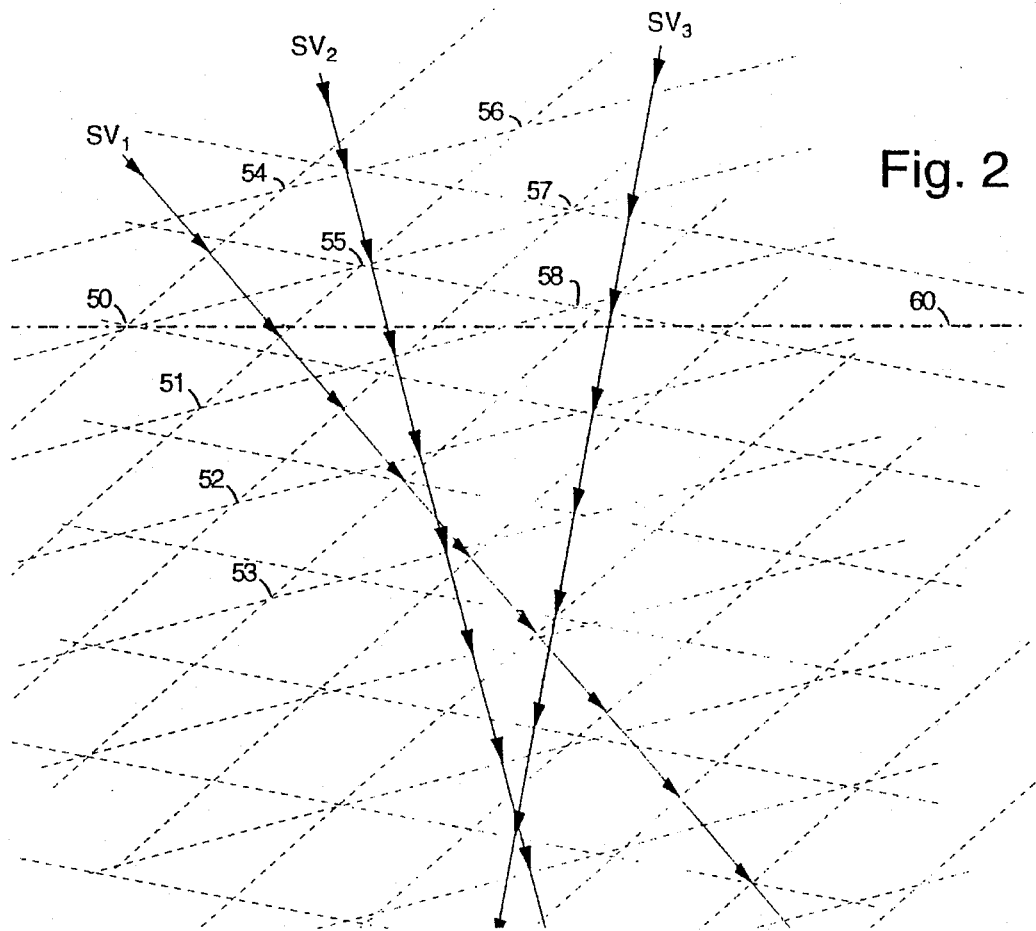
FIG. 2 is a diagram representing the whole-cycle carrier phase wave fronts of signals propagated by three GPS satellites and their resulting interference pattern and intersections.

FIG. 2 illustrates, in simplified two dimensional form, the carrier wave fronts generated by three satellites SV1–SV3. At carrier frequency L1, each wave front is separated from the next by nineteen centimeters. PRN code measurements are too coarse to sort out which wave front is which within any one given neighborhood of wave fronts. The wave fronts are thus ambiguous and represent the well-known carrier phase integer ambiguity problem. The wave fronts from two satellite vehicles, e.g., SV1 and SV2, intersect at a number of points, represented by points 50–58. Without more, each of points 50–58 is indistinguishable from the other. Using the wave fronts from a third satellite vehicle, e.g., SV3, only the intersections represented by points 50, 55 and 57 are coincident with all three wave fronts. A fourth satellite vehicle's wave fronts could be used to resolve between even these intersections to uniquely identify the best solution to the integer ambiguity problem.

System 10 uses both L1 and L2 wave fronts simultaneously to reduce the number of visible satellite vehicles necessary to solve the integer ambiguity problem and to yield high quality results where the best solution is widely separated from the second best solution. The search through the solution tree described by the Knight method is thus shortened and simplified, making OTF operation feasible. In FIG. 2, the grid of wave fronts shown would be supplemented by a second, superimposed grid with a different separation distance between adjacent wave fronts. For L1 and L2, one such grid has the wave fronts separated by approximately nineteen centimeters and the other grid has its wave fronts separated by twenty-four centimeters. This provides a larger number of wave front intersections, but reduces the number of intersection points that are coincident for all the visible satellite vehicles. The search for the unique solution is thus simplified because the number of potential candidates is reduced.

System 10 also provides integer ambiguity solutions based on externally provided constraints, e.g., altitude. For example, given that FIG. 2 is drawn in the vertical plane with respect to the earth, an altitude 60 when used as a constraint, can be used to select point 50 from the field of points 50, 55 and 57 as a unique solution to the integer ambiguity problem. Such constraints are useful in reducing the mathematics search problem and are effective when fewer satellite vehicles are visible.

Real-time kinematic positioning provides for the precise estimation of the location of a stationary or moving rover relative to a reference site. A reference site is established at a point whose location is known relative to the satellite coordinate datum. A reference satellite receiver collects carrier phase, code measurements and data to the satellites at a regular interval, e.g., once every second or epoch. Time-tagged measurements and additional information is transmitted to one or more roving units via a modem/radio or telephone etc. At a rover unit, the reference station data is merged with locally collected satellite measurements at the lowest common measurement update rate (e.g., every second). There is a finite delay in the position solution that is computed from the raw reference and rover stations. The solution delay is a function of the radio/modem bandwidth, any delays in the reference station measurement system and the rover station measurement and position update systems.

The solution latency has minimal impact for a static situation where the reference and rover are stationary. However, when the rover is attempting to navigate while moving, the solution latency causes the displayed position to lag the actual location of the user.

In addition to the solution latency, the measurement update rate used in a system governs how often the user position will be updated. For high precise/dynamic applications, a fast update rate of ten to fifty Hertz is desirable. The bandwidth of the datalink between the reference and rover sites places a limit on the measurement update rate of the system. Even with a data compression algorithm, a maximum update rate is reached.

Figure 3:
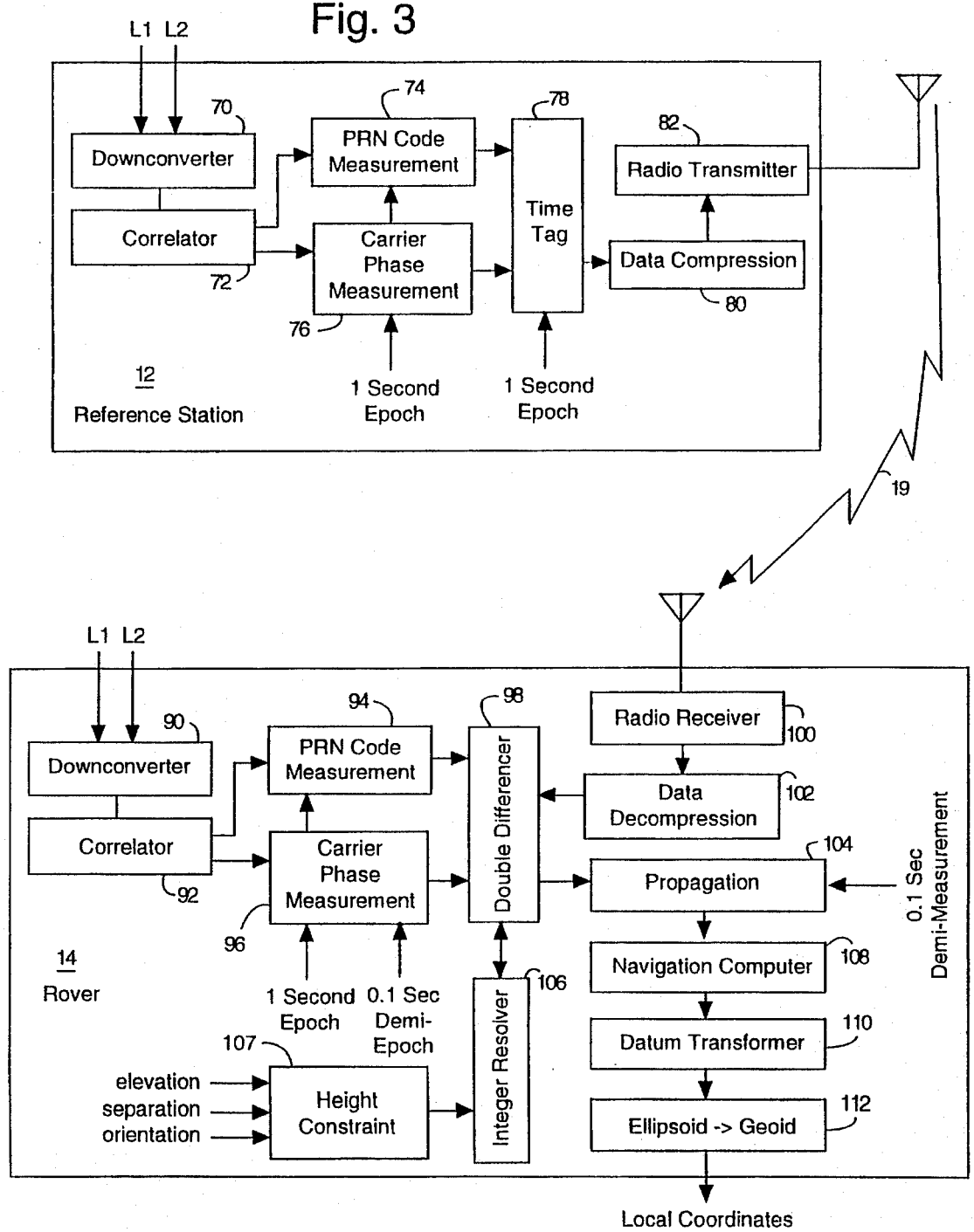
FIG. 3 is a block diagram of the reference station and rover of FIG. 1.

FIG. 3 illustrates the construction of reference station 12 and rover 14. Reference station 12 inputs the signals 20, 22 and 24 (both L1 and L2) into a downconverter 70. A correlator 72 extracts information from an intermediate frequency signal produced by the downconverter 70 and feeds such carrier and code information out to a PRN code measurement unit 74 and a carrier phase measurement unit 76. The epoch, which occurs at one second intervals, is used to trigger the four-observable measurements related to signals represented by signals 20, 22 and 24, and to time tag such measurements in a time tag unit 78. Time-tagged data is then fed to a data compression unit 80 for radio transmission out by a transmitter 82. The compression of data and obtaining of measurements at each one second epoch keep the volume of data required to be carried by the data link 19 to rover 14 to a reasonable level. For example, a 2400 baud channel can be used to carry the information obtained by the reference station 12.

The rover 14 receives signals represented by signals 21, 23 and 25 and produces an intermediate frequency composite from them in a downconverter 90. A correlator 92 extracts information from the intermediate frequency that is supplied to a PRN code measurement unit 94 and a carrier phase measurement 96. Four observables for each signal 21, 23 and 25 are provided to a double differencing unit 98 at the one second epoch rate. A radio receiver (or datalink subsystem) 100 receives the data from the reference station 12 over data link 19 and a data decompression unit 102 extracts the original time-tagged data. Double differencing unit 98 combines the measurements taken at both the reference station 12 and the rover 14 to eliminate clock errors 26, 28, 30 32 and 34 (FIG. 1). Unbiased measurements are then made available to a propagation unit 104 at a demi-measurement rate of ten per second.

Once a pair of main measurement epochs has been obtained, as identified by their respective time tags, a demi-measurement propagation process can begin. All of the demi-epochs in the rover 14 are used to propagate forward a last main measurement update obtained at an epoch. Demi-measurement updates are more frequent than the main measurement updates and therefore can catch up quickly with the current epoch time. In this way, the demi-measurement propagation reduces solution latency and also gives the user a more continuous location estimate.

Demi-measurement propagation introduces some small errors into the user position. GPS has an intentional dither on the civilian signals. Dithering is typically on the order of one centimeter per second squared. As long as the main epoch updates are obtained every second, and the main epoch solution latency is less than one second, the demi-measurement propagation errors should be less than $0.5 \times 1.0$ cm/s$^2$, times the current dilution of precision (DOP). Under normal conditions, errors of two centimeters or less would be experienced.

FIG. 3 further illustrates an integer resolution unit 106 that uses the four observables of L1 and L2 code and phase from the visible satellite vehicles 16–18 to quickly determine a unique solution to the integer ambiguity problem. A height restraint unit 107 connected to the integer resolution unit 106 reduces the search space of ambiguous carrier phase integers by introducing at least one of an elevation, separation, distance and orientation constraint. A navigation computer 108 is used to solve the position of rover 14 to within a few centimeters on-the-fly ten times a second. A datum transformer 110 is used to convert from other formats, such as WGS-84, to a local coordinate format, e.g., northern-east-elevation (NEE) format so that the precise measurements obtained will conform to the datums used in local topographic maps, for example. An ellipsoid-to-geoid converter 112 corrects for variations in the geoid-spheroid separation that might exist in the geographical area of use.

FIG. 4 illustrates a remote vehicle control system 120 which comprises a remote controlled vehicle 122, a remote control unit 124 and a reference station 126. A radio link 128 provides GPS signal measurement data to a rover 130. Reference station 126, radio link 128 and rover 130 are similar in construction and function to reference station 12, data link 19 and rover 14 illustrated in FIGS. 1 and 3. OTF-RTK local coordinate data is communicated near continuously over a radio link 132 to a controller 134. A mathematical model 136 provides guidance plan information for vehicle 122. For example, such information may be the flight path for a plane when vehicle 122 is an airplane, or the information may be the model extracted from a topographic survey of a coal seam in the earth when the vehicle 122 is an open-pit coal excavator. The controller 134 compares the math model information to the position information and issues a servo control signal 138 to a servo unit 140. Such control may be automatic, and include proportional plus integral plus differential (PID) control. A camera 142 provides a video representation of the area surrounding vehicle 122 over a radio link 144 to a monitor (CRT) 146.

The remote vehicle control system 120 may be incorporated into an earth moving and grading system, e.g., as described by Clegg, in U.S. Pat. No. 4,807,131, and incorporated herein by reference. Essentially, the laser equipment disclosed by Clegg is replaced by the elements of system 10, illustrated in FIG. 1 of the present specification. Such a configuration allows robotic control at the rover unit which can adjust a mechanism according to a comparison between GPS position determinations and a predetermined construction model. Such construction models include placements for bridge pilings, coal seam excavation in open-pit mines, and unmanned vehicles.

Although the present invention has been described in terms of the presently preferred embodiment, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A system, comprising:

a reference station (12, 126) including a GPS satellite navigation receiver and measurement means (70, 72, 74, 76) connected to output (19, 128) single carrier frequency code and phase measurements from a fixed location;

a rover unit (14, 130) including a GPS satellite navigation receiver and measurement means (90, 92, 94, 96) connected to output (132) single carrier frequency code and phase measurements from a movable vehicle and including an output for position determinations;

double-differencing means (98) connected to receive phase and code measurement information transmitted from the reference station and rover unit and then difference said measurement information to subtract out satellite-common and receiver-common clock errors, wherein substantially unbiased phase and code measurement information is output;

integer ambiguity resolution means (106) connected to the double-differencing means and including integer search means for searching carrier frequency phase and code measurements using a search tree of integer candidates that provides for a list of the best candidates and that provides for the resolution of the correct integer candidate, wherein a unique solution for whole-cycle carrier phase ambiguity is provided for kinematic or static initialization;

a navigation computer (108) connected to receive said unbiased phase and code measurement information and to provide an output of near-continuous position estimates of the rover unit; and robotic control means (134) connected to receive said near-continuous position estimates from the navigation computer in the rover unit for servo-controlling a remote-controlled vehicle according to a plurality of comparisons made between said near-continuous position estimates and a predetermined construction model of ideal positions for said remote-controlled vehicle.

2. A system, comprising:

a reference station (12, 126) including a satellite navigation receiver and measurement means connected to output carrier frequency code and phase measurements from a fixed location;

a rover unit (14, 130) including a satellite navigation receiver and measurement means connected to output carrier frequency code and phase measurements from a movable vehicle;

double-differencing means (98) connected to receive phase and code measurement information transmitted from the reference station and rover unit and then difference said measurement information to subtract out satellite-common and receiver-common clock errors, wherein substantially unbiased phase and code measurement information is output;

integer ambiguity resolution means (106) connected to the double-differencing means and including integer search means for pruning a search tree of integer ambiguities for a first carrier frequency (L1) using the simultaneous narrow-lane intersections of both the first carrier frequency (L1) and a second carrier frequency (L2); and a navigation computer (108) connected to receive said unbiased phase and code measurement information and to provide an output of near-continuous position estimates of the rover unit.

3. The system of claim 2, further comprising:

height constraint means connected to the integer ambiguity resolution means for further reducing the search space of ambiguous carrier phase integers by introducing at least one of an elevation, separation distance and orientation constraint.

4. The system of claim 2, further comprising:

a radio transmitter connected to the reference station and a radio receiver connected to the rover unit for communicating said first and second carrier frequency code and phase measurements from the reference station to the rover unit;

data compression means connected to the radio transmitter and data decompression means connected to the radio receiver for lowering the data traffic volume necessary to communicate said first and second carrier frequency code and phase measurements;

epoch timing means connected to the reference station for time-tagging said first and second carrier frequency code and phase measurements; and epoch synchronizing means connected to the rover unit for matching said first and second carrier frequency code and phase measurements in pairs for input to the double-differencing means.

5. The system of claim 2, further comprising:

demi-epoch timing means connected to the rover unit for obtaining said first and second carrier frequency code and phase measurements at the rover unit between epoch periods; and propagation means connected to the demi-epoch timing means for propagating position updates from said first and second carrier frequency code and phase measurements at the rover unit between epoch periods together with a latest of said first and second carrier frequency code and phase measurements obtained by the reference station at an epoch period.

6. The system of claim 2, further comprising:

datum transformation means connected to the rover unit for outputting centimeter-level accurate position fixes in a local coordinate format; and ellipsoid-to-geoid conversion means connected to the datum transformation means for outputting locally corrected height information.

7. The system of claim 2, further comprising:

a remotely-controlled vehicle fixed to the rover unit.

8. The system of claim 2, further comprising:

a servo-controlled mechanism proximate to the rover unit;

a computer-based digital model in communication with the rover unit;

controller means in communication with the digital model and the servo-controlled mechanism and having an input to receive centimeter-level accurate position fixes in a local coordinate format from the rover unit; and communication means connected to the controller means for operating the servo-controlled mechanism in accordance to a comparison made between the centimeter-level accurate position fixes and said digital model.

9. The system of claim 8, further comprising:

a video camera proximate to the servo-controlled mechanism; and a video monitor in communication with the video camera for providing a visual display of an area proximate to the rover unit.

\* \* \* \* \*